US012755138B2

(12) United States Patent
Nomura et al.

(10) Patent No.: US 12,755,138 B2
(45) Date of Patent: Oct. 6, 2026

(54) NEURAL NETWORK APPARATUS

(71) Applicant: KABUSHIKI KAISHA TOSHIBA, Tokyo (JP)

(72) Inventors: Kumiko Nomura, Tokyo (JP); Yoshifumi Nishi, Yokohama (JP); Takao Marukame, Tokyo (JP); Koichi Mizushima, Kamakura (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 1072 days.

(21) Appl. No.: 17/823,524

(22) Filed: Aug. 31, 2022

(65) Prior Publication Data

US 2023/0289579 A1 Sep. 14, 2023

(30) Foreign Application Priority Data

Mar. 11, 2022 (JP) ................................. 2022-038229

(51) Int. Cl.
*G06N 3/063* (2023.01)
*G06N 3/08* (2023.01)

(52) U.S. Cl.
CPC ............... *G06N 3/063* (2013.01); *G06N 3/08* (2013.01)

(58) Field of Classification Search
CPC ............................... G06N 3/063; G06N 3/065
See application file for complete search history.

(56) References Cited

U.S. PATENT DOCUMENTS

2017/0213129 A1 7/2017 Lee
2019/0057301 A1 2/2019 Pantazi et al.
2019/0138900 A1* 5/2019 Linares-Barranco .... G06N 3/08
2019/0197391 A1* 6/2019 Chen ...................... G06N 3/049
(Continued)

FOREIGN PATENT DOCUMENTS

JP 2017-134821 A 8/2017
JP 2020-531954 A 11/2020

OTHER PUBLICATIONS

Joseph M. Brader et al., "Learning Real-World Stimuli in A Neural Network with Spike-Driven Synaptic Dynamics," Neural computation, vol. 19, pp. 2881-2912 (2007).
(Continued)

*Primary Examiner* — Schyler S Sanks
(74) *Attorney, Agent, or Firm* — Finnegan, Henderson, Farabow, Garrett & Dunner, LLP

(57) ABSTRACT

A neural network apparatus according to an embodiment includes neuron circuits, synaptic circuits, and a control circuit. A firing circuit of each neuron circuit outputs a firing signal when absolute value of the internal potential is larger than a firing threshold. A firing threshold adjustment circuit of each neuron circuit changes the firing threshold in accordance with frequency of the firing signal. When the firing signal is output from a pre-synaptic neuron circuit, the synaptic circuit changes the synaptic weight in accordance with a contrast between a learning threshold and the absolute value of the internal potential held in a post-synaptic neuron circuit. The control circuit changes the learning threshold in accordance with frequency of the firing signal from a target neuron circuit. The learning threshold is used for changing the synaptic weight stored in one or more synaptic circuits each outputting the output signal to the target neuron.

12 Claims, 9 Drawing Sheets

(56) References Cited

U.S. PATENT DOCUMENTS

| | | | | |
|---|---|---|---|---|
| 2019/0236443 | A1 | 8/2019 | Koelmans et al. | |
| 2020/0143229 | A1* | 5/2020 | Van Der Made .... | G06N 3/0464 |
| 2021/0056383 | A1* | 2/2021 | Nishi .................. | G06N 3/0495 |

OTHER PUBLICATIONS

Andreea Lazar et al., "SORN: a self-organizing recurrent neural network," Frontiers in Computational Neuroscience, vol. 3, Article 23, 9 pages (2009).

Japan Patent Office, Decision to Grant a Patent in JP App. No. 2022-038229, 1 page, and machine translation, 2 pages (Dec. 10, 2024).

* cited by examiner

NEURAL NETWORK APPARATUS

CROSS-REFERENCE TO RELATED APPLICATIONS

This application is based upon and claims the benefit of priority from Japanese Patent Application No. 2022-038229, filed on Mar. 11, 2022; the entire contents of which are incorporated herein by reference.

FIELD

Embodiments described herein relate generally to a neural network apparatus.

BACKGROUND

In recent years, a technology for implementing a neuromorphic processor by using a hardware-based neural network has been proposed. The neuromorphic processor includes, for example, a neuron circuit and a synaptic circuit. The synaptic circuit stores a synaptic weight, and supplies, to a post-synaptic neuron, a signal obtained by adding influence of the synaptic weight to a signal received from a pre-synaptic neuron. The neuron circuit holds an internal potential. The neuron circuit increases or decreases the internal potential according to a signal output from the synaptic circuit connected to a preceding stage. The neuron circuit outputs a firing signal in accordance with the magnitude of the internal potential. The neuron circuit outputs a firing signal when the internal potential exceeds a firing threshold.

The synaptic weight is updated by a given learning method. As a learning method of a neuromorphic processor, for example, there is a method of updating the synaptic weight according to an internal potential held in a post-synaptic neuron circuit at the time of firing a pre-synaptic neuron circuit. More specifically, in this method, the synaptic weight is made lower as the internal potential held in the post-synaptic neuron circuit becomes lower, and the synaptic weight is made higher as the internal potential held in the post-synaptic neuron circuit becomes higher. As a result, according to this method, it is possible to increase the synaptic weight that strongly influences firing of the post-synaptic neuron circuit, and to increase accuracy of inference by the neural network.

In addition, it may be desirable for the neuromorphic processor to set a firing frequency of each of the neuron circuits in a relatively narrow range. For example, a neuromorphic processor that implements a recurrent neural network such as a reservoir can improve inference accuracy by adjusting firing frequencies of neuron circuits to a relatively narrow range. For example, the neuromorphic processor detects the firing frequency of each of the neuron circuits, and adjusts the firing frequency by lowering a firing threshold when the firing frequency is lower than the firing threshold.

However, in a case of using the learning method of updating the synaptic weight in accordance with the internal potential held in the post-synaptic neuron circuit at the time of the firing of the pre-synaptic neuron circuit, the synaptic circuit having the neuron circuit with the lowered firing threshold as the post-synaptic neuron updates the synaptic weight on the basis of the low internal potential. Therefore, the synaptic circuit having the neuron circuit with the lowered firing threshold as the post-synaptic neuron performs learning in a direction of constantly reducing the synaptic weight, and there is a possibility that normal learning is not performed.

DETAILED DESCRIPTION

A neural network apparatus according to one embodiment includes a plurality of neuron circuits, a plurality of synaptic circuits, and a control circuit. Each neuron circuit in the plurality of neuron circuits includes a potential holding circuit, a firing circuit, and a firing threshold adjustment circuit. The potential holding circuit is configured to receive an output signal output from a synaptic circuit in the plurality of synaptic circuits and hold internal potential changing in accordance with a level or a time width of the received output signal. The firing circuit is configured to output a firing signal in a case where absolute value of the internal potential is larger than a firing threshold. The firing threshold adjustment circuit is configured to change the firing threshold in accordance with frequency of the firing signal. Each synaptic circuit in the plurality of synaptic circuits includes a weight storage circuit, a transmission circuit, and a learning circuit. The weight storage circuit is configured to store a synaptic weight. The transmission circuit is configured to receive the firing signal output from a pre-synaptic neuron circuit being a neuron circuit in the plurality of neuron circuits and output the output signal to a post-synaptic neuron circuit being a neuron circuit in the plurality of neuron circuits. The output signal is obtained by adding influence of the synaptic weight to the received firing signal. The learning circuit is configured to change the synaptic weight in accordance with a contrast between a learning threshold and the absolute value of the internal potential held in the post-synaptic neuron circuit. The synaptic weight is changed in a case where the firing signal is output from the pre-synaptic neuron circuit. The control circuit is configured to change the learning threshold in accordance with frequency of the firing signal output from a target neuron circuit being at least one neuron circuit in the plurality of neuron circuits. The learning threshold is used for changing the synaptic weight stored in one or more synaptic circuits each outputting the output signal to the target neuron in the plurality of neuron circuits.

Hereinafter, a neural network apparatus 10 according to an embodiment will be described with reference to the drawings. The neural network apparatus 10 according to the embodiment is to normally perform learning while adjusting a firing frequency of a neuron circuit 18 to a relatively narrow range.

Figure 1:
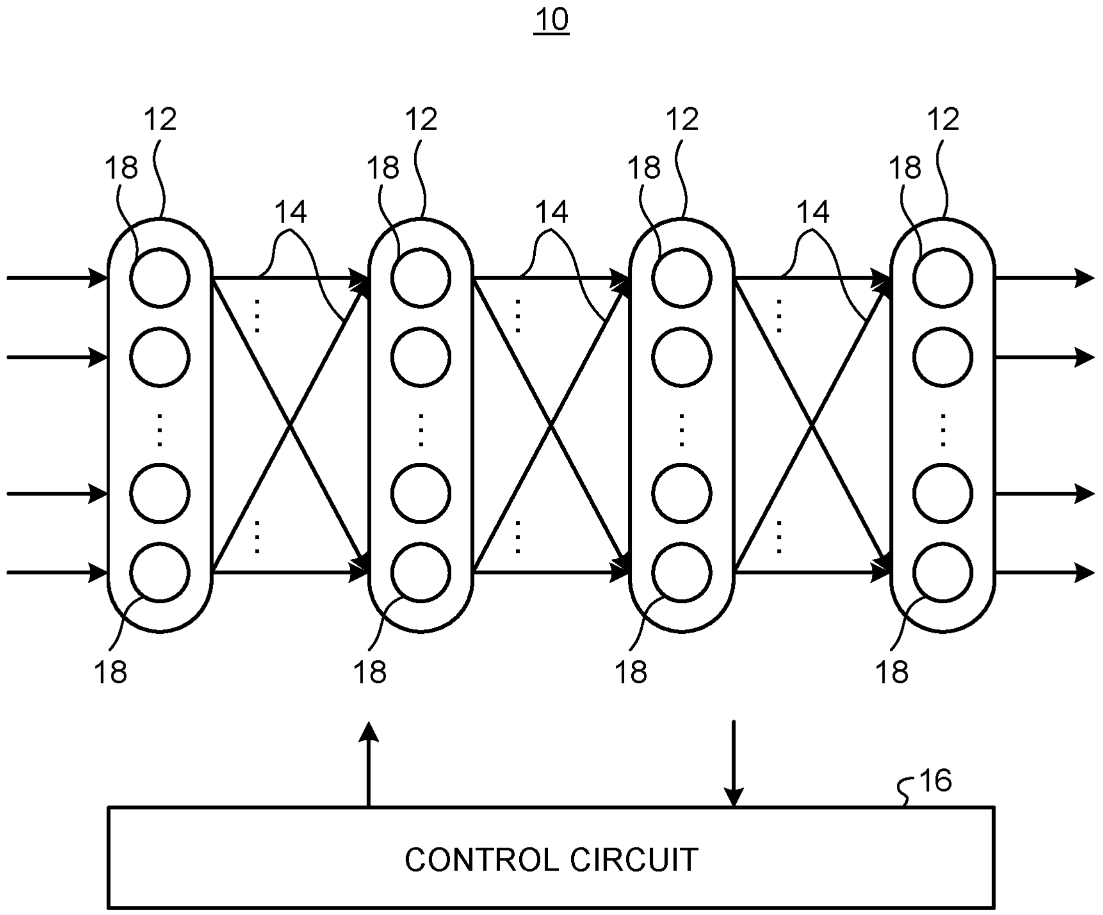
FIG. 1 is a configuration diagram of a neural network apparatus according to an embodiment.

FIG. 1 is a diagram illustrating an example of a configuration of the neural network apparatus 10 according to the embodiment. As an example, the neural network apparatus 10 includes N-stage layers 12 (N is an integer equal to or larger than 2), synaptic circuits 14 each functioning as a synapse in a neural network, and a control circuit 16. Each of the N-stage layers 12 includes neuron circuits 18 each functioning as a neuron in the neural network.

The neuron circuits 18 each acquires firing signals output from pre-synaptic layers 12. Each of the firing signals is transmitted via any one synaptic circuit 14 of the synaptic circuits 14.

A first-stage layer 12 of the N-stage layers 12 acquires a plurality of signals from an external device or an input layer. Each of the neuron circuits 18 performs integration processing on the acquired signals, performs activation function processing on a value obtained by the integration processing, and outputs a firing signal. Each of the neuron circuits 18 executes the integration processing and the activation function processing by an analog circuit, for example. Moreover, in the present embodiment, each of the neuron circuits 18 holds internal potential V as a result of the integration processing on the acquired signals.

Each of the synaptic circuits 14 stores a synaptic weight. The synaptic weight indicates a binary number of a first value or a second value. In the present embodiment, the first value indicates a higher value of the two values, and is H logic or 1, for example. In the present embodiment, the second value indicates a lower value of the two values, and is L logic or 0, for example. Note that the synaptic weight is not limited to the binary number, and may be indicated by multiple values of a ternary number or more. Moreover, the synaptic weight may be indicated by an analog value, for example, by an amount of charge accumulated in a capacitor or the like, or a resistance value of a variable resistance. The synaptic weight stored in each of the synaptic circuits 14 is set by learning processing.

For example, each of the synaptic circuits 14 connecting an n-th stage layer 12 and an (n+1)-th stage layer 12 acquires a firing signal output from one neuron circuit 18 in the neuron circuits 18 of the n-th stage layer 12. Each of the synaptic circuits 14 connecting the n-th stage layer 12 and the (n+1)-th stage layer 12 generates an output signal obtained by addition of influence of the stored synaptic weight to the received firing signal, and supplies the generated output signal to one neuron circuit 18 in the plurality of neuron circuits 18 included in the (n+1)-th stage layer 12.

The control circuit 16 receives the firing signal from each of the neuron circuits 18, and controls a learning threshold (an example of a parameter) used for the learning processing of the synaptic weight stored in each of the synaptic circuits 14 in accordance with the received firing signal. The control circuit 16 may receive a frequency signal indicating the firing frequency of the firing signal from each of the neuron circuits 18.

In such a neural network apparatus 10, the first-stage layer 12 acquires one or more signals from an external device or an input layer. Then, the neural network apparatus 10 outputs, from an n-th stage layer 12, one or more signals indicating a result of calculation executed by the neural network on the received one or more signals.

Note that the neural network apparatus 10 is not limited to the configuration illustrated in FIG. 1, and may be configured in accordance with a recurrent neural network such as a reservoir. In this case, at least one of the synaptic circuits 14 feeds back the output signal and supplies the output signal to a neuron circuit 18. For example, in a case where the neural network apparatus 10 is configured in accordance with the recurrent neural network such as the reservoir, at least one of the synaptic circuits 14 receives the firing signal output from a neuron circuit 18 included in the n-th stage layer 12, and supplies the output signal to a neuron circuit 18 included in the layer in the n-th stage or a layer preceding the n-th stage. Moreover, instead of the layer structure as illustrated in FIG. 1, the neural network apparatus 10 may be a recurrent neural network having a configuration, in which multiple neuron circuits 18 are randomly connected.

Figure 2:
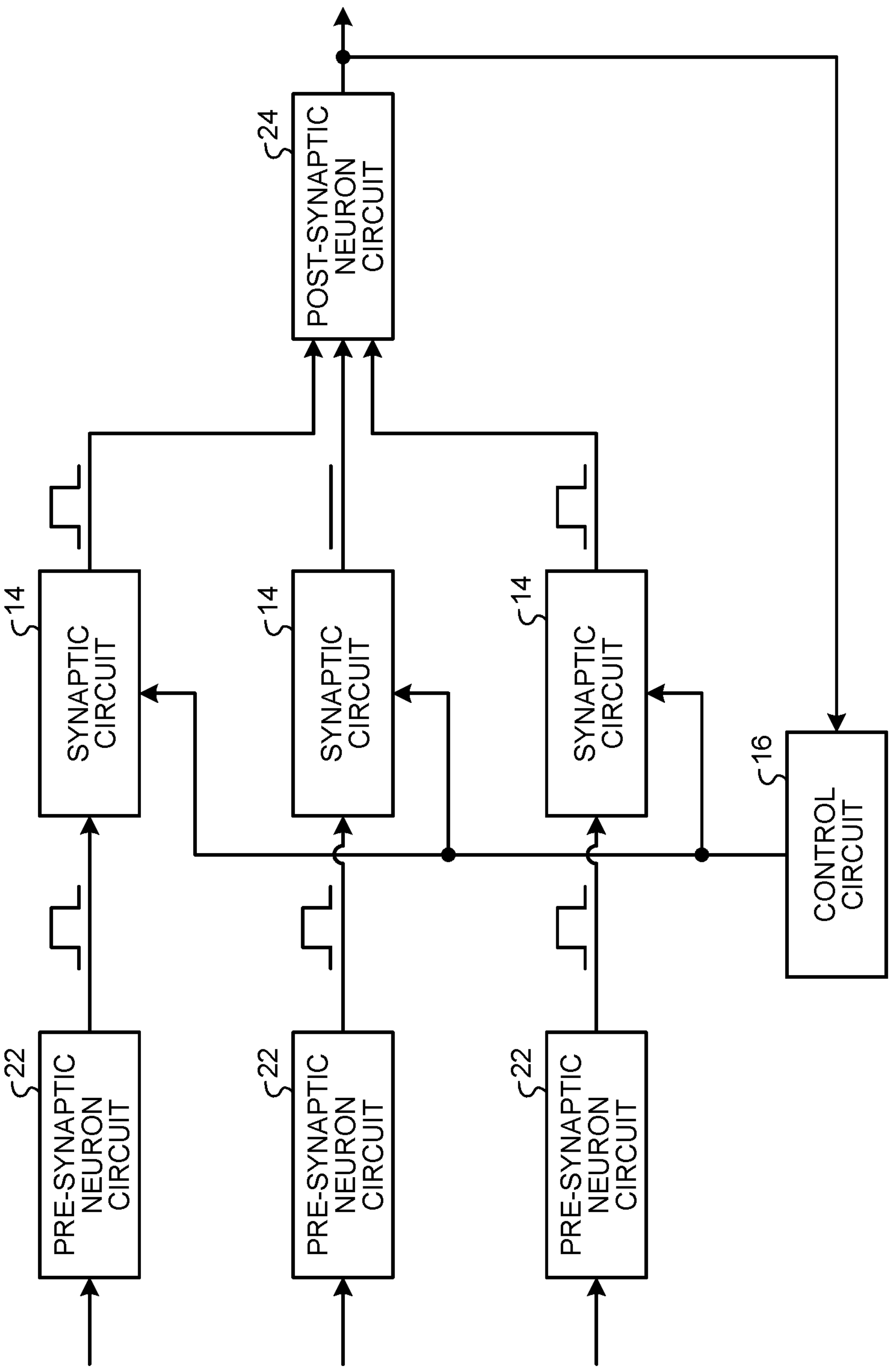
FIG. 2 is a diagram illustrating a connection relationship among synaptic circuits.

FIG. 2 is a diagram illustrating a connection relationship among the synaptic circuits 14 together with the control circuit 16. Each of the synaptic circuits 14 acquires a firing signal output from a pre-synaptic neuron circuit 22 that is any one of the neuron circuits 18. Each of the synaptic circuits 14 outputs an output signal obtained by addition of influence of the stored synaptic weight to the received firing signal. Then, the synaptic circuit 14 supplies the output signal to a post-synaptic neuron circuit 24 that is any one of the neuron circuits 18.

With respect to a target neuron circuit that is at least one of the neuron circuits 18, the control circuit 16 changes, in accordance with the frequency of the firing signal, learning thresholds used for changing synaptic weights stored in one or more synaptic circuits 14, each outputting an output signal to the target neuron circuit in the synaptic circuits 14. A learning threshold used for learning processing is set in each of the synaptic circuits 14. The control circuit 16 changes the learning thresholds, which are set in all the one or more synaptic circuits 14 that output the output signals to the target neuron circuit, in the same direction (increasing direction or reducing direction). The control circuit 16 may treat each of the neuron circuits 18 as the target neuron circuit and change the learning thresholds in the one or more synaptic circuits 14 that output the output signals to the target neuron circuit. Alternatively, the control circuit 16 may treat part of the neuron circuits 18 as the target neuron circuit(s) and change the learning thresholds in the one or more synaptic circuits 14 that output the output signals to the target neuron circuit(s).

Figure 3:
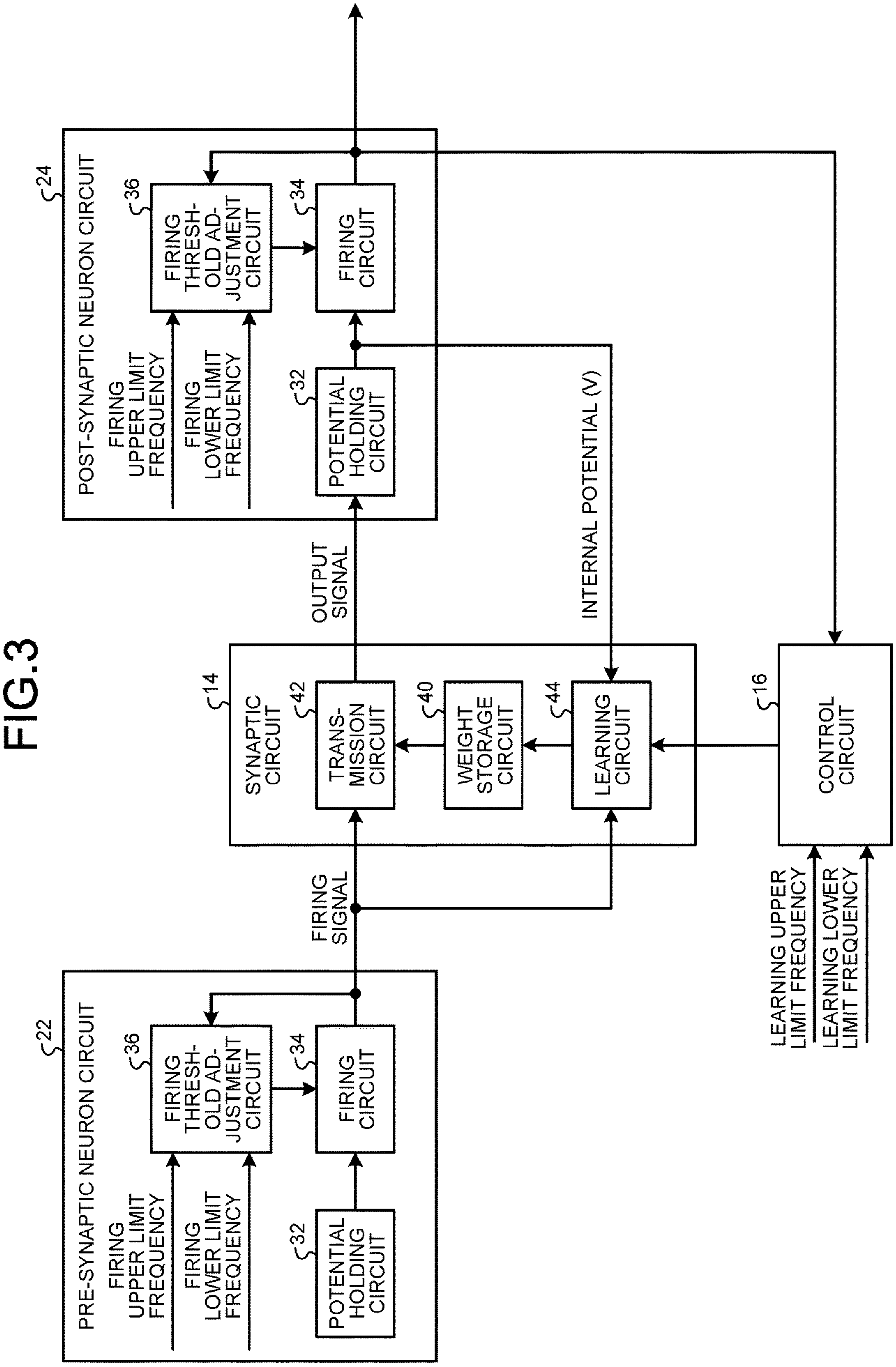
FIG. 3 is a configuration diagram of a neuron circuit, a synaptic circuit, and a control circuit.

FIG. 3 is a diagram illustrating configurations of the pre-synaptic neuron circuit 22, the post-synaptic neuron circuit 24, the synaptic circuit 14, and the control circuit 16. Each of the neuron circuits 18 holds the internal potential V that varies in response to reception of the output signal. Then, each of the neuron circuits 18 outputs a firing signal in accordance with the held internal potential V.

For example, each of the pre-synaptic neuron circuit 22 and the post-synaptic neuron circuit 24 includes a potential holding circuit 32, a firing circuit 34, and a firing threshold adjustment circuit 36.

The potential holding circuit 32 acquires output signals from the synaptic circuit 14. In a case of receiving any of the output signals, the potential holding circuit 32 increases the internal potential V by a given amount. In addition, the potential holding circuit 32 may reduce the internal potential V with the lapse of time in a period in which no output signal is received. The potential holding circuit 32 may include, for example, a capacitor. In this case, in a case of receiving the output signals, the potential holding circuit 32 charges the capacitor with a given amount of charge. In addition, the potential holding circuit 32 discharges the charge, which is held in the capacitor, with the lapse of time in the period in which no output signal is received. As a result, the potential holding circuit 32 can increase the internal potential V by the given amount in a case where any output signal is received, and can reduce the internal potential V with the lapse of time in the period in which no output signal is received. The internal potential V held by the neuron circuit 18 is described, for example, as a postsynaptic neuron V in "Learning real-world stimuli in a neural network with spike-driven synaptic dynamics", Joseph M. Brader et al., Neural computation, Volume 19, Massachusetts Institute of Technology, P2881-2912, November 2007.

The firing circuit 34 outputs a firing signal in a case where the internal potential V held by the potential holding circuit 32 is larger than a firing threshold. In the present embodiment, the firing circuit 34 outputs a firing signal that becomes H logic at a firing start timing and that becomes L logic after a certain time elapses from the firing start timing. That is, in the present embodiment, the firing circuit 34 changes the firing signal from L logic to H logic at the firing start timing when the internal potential V becomes larger than the firing threshold. Then, the firing circuit 34 changes the firing signal from H logic to L logic after a certain time elapses from the firing start timing. Note that the firing circuit 34 may stochastically output the firing signal in a case where the internal potential V becomes larger than the firing threshold.

The firing threshold adjustment circuit 36 changes the firing threshold, which is set in the firing circuit 34, in accordance with frequency of the firing signal output from the firing circuit 34. More specifically, the firing threshold adjustment circuit 36 increases the firing threshold in a case where the frequency of the firing signal is equal to or higher than a firing upper limit frequency given in advance. Moreover, the firing threshold adjustment circuit 36 reduces the firing threshold in a case where the frequency of the firing signal is lower than a firing lower limit frequency given in advance. The firing upper limit frequency indicates an upper limit value of the frequency of the firing signal. The firing lower limit frequency indicates a lower limit value of the frequency of the firing signal. Note that the firing lower limit frequency is equal to the firing upper limit frequency or lower than the firing upper limit frequency.

The frequency of the firing signal indicates the number of times of output of the firing signal per predetermined time. For example, the firing threshold adjustment circuit 36 generates a frequency signal, which represents the frequency of the firing signal by a voltage, by an analog integration circuit using a capacitor, and compares the voltage of the generated frequency signal with a voltage representing the firing upper limit frequency and a voltage representing the firing lower limit frequency. Then, when the frequency signal becomes equal to or higher than the voltage representing the firing upper limit frequency, the firing threshold adjustment circuit 36 increases the firing threshold. On the other hand, when the frequency signal becomes lower than the voltage representing the firing lower limit frequency, the firing threshold adjustment circuit 36 reduces the firing threshold. The firing threshold adjustment circuit 36 may digitally calculate the frequency of the firing signal by using a digital counter or the like.

At the timing when the firing signal is output, the firing threshold adjustment circuit 36 may increase or reduce the firing threshold by comparing the frequency of the firing signal with the firing upper limit frequency and the firing lower limit frequency. In addition, at every fixed time or every time a given event is generated, the firing threshold adjustment circuit 36 may increase or reduce the firing threshold by comparing the frequency of the firing signal with the firing upper limit frequency and comparing the frequency of the firing signal with the firing lower limit frequency.

The firing threshold adjustment circuit 36 may change the firing threshold stepwise at every given step. For example, the firing threshold adjustment circuit 36 may change the firing threshold in steps such as units of 0.1 volts. In this case, the firing threshold adjustment circuit 36 adjusts the firing threshold as in an expression (1).

$$V_{Ith} = \begin{cases} V_{Ith} + \Delta V_I^+ \ \ldots \ H \geqq H_{Iup} \\ V_{Ith} + \Delta V_I^- \ \ldots \ H < H_{Idw} \end{cases} \tag{1}$$

In the expression (1), $V_{Ith}$ indicates the firing threshold. H indicates the frequency of the firing signal. $H_{Iup}$ indicates the firing upper limit frequency. $H_{Idw}$ indicates the firing lower limit frequency.

$$\Delta V_I^+$$

indicates an increase amount of the firing threshold of a case where the frequency of the firing signal becomes equal to or higher than the firing upper limit frequency.

$$\Delta V_I^-$$

indicates a reduce amount of the firing threshold of a case where the frequency of the firing signal becomes lower than the firing lower limit frequency.

$$\Delta V_I^+ \text{ and } \Delta V_I^-$$

may be equal.

Note that the firing threshold is given an adjustable range. In a case where the firing threshold is an upper limit value of the adjustable range, the firing threshold adjustment circuit 36 does not increase the firing threshold even when the frequency of the firing signal becomes equal to or higher than the firing upper limit frequency. In addition, in a case where the firing threshold is a lower limit value of the adjustable range, the firing threshold adjustment circuit 36 does not reduce the firing threshold even when the frequency of the firing signal becomes lower than the firing lower limit frequency.

By increasing the firing threshold, the firing threshold adjustment circuit 36 can reduce a possibility that the firing circuit 34 outputs the firing signal. As a result, in a case where the frequency of the firing signal becomes equal to or higher than the firing upper limit frequency, the firing threshold adjustment circuit 36 can reduce the frequency of the firing signal. In addition, by reducing the firing threshold, the firing threshold adjustment circuit 36 can increase the possibility that the firing circuit 34 outputs the firing signal. As a result, in a case where the frequency of the firing signal becomes lower than the firing lower limit frequency, the firing threshold adjustment circuit 36 can increase the frequency of the firing signal. Such a firing threshold adjustment circuit 36 can adjust frequency of a firing signal, which is output from a neuron circuit 18, to a vicinity of the range between the firing lower limit frequency and the firing upper limit frequency. Thus, the neural network apparatus 10 can adjust the frequency of the firing signal output from each of the neuron circuits 18 to the preset range and improve the inference accuracy.

Moreover, the firing threshold adjustment circuit 36 may reset the firing threshold (such as each of the firing lower limit frequency and the firing upper limit frequency) to a preset value, for example, at a predetermined timing or stochastically. As a result, regardless of the frequency of the firing signal, the firing threshold adjustment circuit 36 can reset the firing threshold (such as each of the firing lower limit frequency and the firing upper limit frequency) and cause learning to be performed again.

Each of the synaptic circuits 14 includes a weight storage circuit 40, a transmission circuit 42, and a learning circuit 44.

The weight storage circuit 40 stores a synaptic weight. In the present embodiment, the weight storage circuit 40 stores a synaptic weight indicating a first value or a second value. Note that the weight storage circuit 40 may store a multi-valued synaptic weight of a ternary number or more, or a synaptic weight of an analog value.

The transmission circuit 42 receives the firing signal output from the pre-synaptic neuron circuit 22, and supplies, to the post-synaptic neuron circuit 24, an output signal obtained by addition of influence of the synaptic weight stored in the weight storage circuit 40 to the received firing signal.

For example, in a case where the firing signal is received from the pre-synaptic neuron circuit 22 and the synaptic weight stored in the weight storage circuit 40 is the first value, the transmission circuit 42 supplies the output signal to the post-synaptic neuron circuit 24. For example, in a case where the firing signal is received from the pre-synaptic neuron circuit 22 and the synaptic weight stored in the weight storage circuit 40 is the second value, the transmission circuit 42 does not give the output signal to the post-synaptic neuron circuit 24. Alternatively, for example, in a case where the firing signal is received from the pre-synaptic neuron circuit 22 and the synaptic weight stored in the weight storage circuit 40 is the second value, the transmission circuit 42 supplies the output signal to the post-synaptic neuron circuit 24 at a timing later than a timing when the output signal is supplied to the post-synaptic neuron circuit 24 in a case where the synaptic weight is the first value. Moreover, for example, in a case where the synaptic weight is indicated by multiple values or an analog value, each of the synaptic circuits 14 may output, as an output signal, a pulse having a level or a time width corresponding to the synaptic weight in response to reception of the firing signal. As a result, the transmission circuit 42 can supply, to the post-synaptic neuron circuit 24, the output signal obtained by addition of the influence of the synaptic weight stored in the weight storage circuit 40 to the received firing signal.

Such a transmission circuit 42 may execute multiplication processing of multiplying the firing signal by the synaptic weight in the neural network in an analog manner.

In a case where the firing signal is output from the pre-synaptic neuron circuit 22, the learning circuit 44 changes the synaptic weight in accordance with a contrast between the learning threshold and absolute value of the internal potential V held in the post-synaptic neuron circuit 24.

More specifically, in a case where the firing signal is output from the pre-synaptic neuron circuit 22, the learning circuit 44 increases the synaptic weight in a case where the absolute value of the internal potential V held in the post-synaptic neuron circuit 24 is equal to or larger than a first learning threshold. Moreover, in a case where the firing signal is output from the pre-synaptic neuron circuit 22, the learning circuit 44 reduces the synaptic weight in a case where the absolute value of the internal potential V held in the post-synaptic neuron circuit 24 is smaller than a second learning threshold. Each of the first learning threshold and the second learning threshold is a learning threshold. Note that the second learning threshold is equal to the first learning threshold or smaller than the first learning threshold.

For example, in a case where the synaptic weight is indicated by the binary number of the first value or the second value, the following operation is performed.

In a case where the internal potential V is equal to or larger than the first learning threshold and the stored synaptic weight is the second value, the learning circuit 44 changes the synaptic weight to the first value with a first probability in response to reception of the firing signal from the pre-synaptic neuron circuit 22. More specifically, it is assumed that the first probability is A (A is a value larger than 0 and equal to or smaller than 1). In this case, in a case where the internal potential V is equal to or larger than the first learning threshold and the stored synaptic weight is the second value, in response to reception of the firing signal, the learning circuit 44 changes the synaptic weight to the first value with the probability of A, and maintains the synaptic weight at the second value with the probability of (1−A). Note that the learning circuit 44 maintains the synaptic weight at the first value in a case where the internal potential V is equal to or larger than the first learning threshold and the synaptic weight is the first value.

Moreover, in a case where the internal potential V is smaller than the second learning threshold and the stored synaptic weight is the first value, the learning circuit 44 changes the synaptic weight to the second value with the first probability in response to reception of the firing signal from the pre-synaptic neuron circuit 22. More specifically, in a case where the internal potential V is smaller than the second learning threshold and the stored synaptic weight is the first value, in response to reception of the firing signal, the learning circuit 44 changes the synaptic weight to the second value with the probability of A, and maintains the synaptic weight at the first value with the probability of (1−A). Note that the learning circuit 44 maintains the synaptic weight at the second value in a case where the internal potential V is smaller than the second learning threshold and the synaptic weight is the second value.

Moreover, in a case where the synaptic weight is indicated by multiple values or an analog value, the learning circuit 44 changes the synaptic weight as in an expression (2) at the timing when the firing signal is output from the pre-synaptic neuron circuit 22.

$$W = \begin{cases} W + \alpha \ \ldots \ V \geqq V_{Lup} \\ W - \beta \ \ldots \ V < V_{Ldw} \end{cases} \tag{2}$$

In the expression (2), W indicates the synaptic weight. V indicates the internal potential held in the post-synaptic neuron circuit 24. $V_{Lup}$ is a voltage indicating the first learning threshold. $V_{Ldw}$ is a voltage indicating the second learning threshold. α indicates an increase amount of the synaptic weight of a case where the internal potential V is equal to or larger than the first learning threshold. β indicates a reduce amount of the synaptic weight of a case where the internal potential V is smaller than the second learning threshold.

Note that a changeable range of the synaptic weight is set in a case where the synaptic weight is indicated by multiple values or an analog value. In a case where the synaptic weight is an upper limit value of the changeable range, the learning circuit 44 does not increase the synaptic weight even when the internal potential V becomes equal to or larger than the first learning threshold. Moreover, in a case where the synaptic weight is a lower limit value of the changeable range, the learning circuit 44 does not reduce the synaptic weight even when the internal potential V becomes smaller than the second learning threshold.

In a case where correlation between the output of the firing signal from the pre-synaptic neuron circuit 22 and the internal potential V held in the post-synaptic neuron circuit 24 is strong, the learning circuit 44 can learn the synaptic weight in such a manner as to strengthen a mutual relationship between the pre-synaptic neuron circuit 22 and the post-synaptic neuron circuit 24. Moreover, in a case where the correlation between the output of the firing signal from the pre-synaptic neuron circuit 22 and the internal potential V held in the post-synaptic neuron circuit 24 is weak, such a learning circuit 44 can learn the synaptic weight in such a manner as to weaken the mutual relationship between the pre-synaptic neuron circuit 22 and the post-synaptic neuron circuit 24.

In accordance with the frequency of the firing signal output from the post-synaptic neuron circuit 24, the control circuit 16 changes the learning thresholds respectively set in all the synaptic circuits 14 that supply the output signals to the post-synaptic neuron circuit 24. More specifically, the control circuit 16 increases the learning thresholds in a case where the frequency of the firing signal is equal to or higher than a preset learning upper limit frequency. In a case where the first learning threshold and the second learning threshold are set as the learning thresholds in the synaptic circuits 14, the control circuit 16 increases both the first learning threshold and the second learning threshold in a case where the frequency of the firing signal is equal to or higher than the learning upper limit frequency.

Moreover, the control circuit 16 reduces the learning thresholds in a case where the frequency of the firing signal is lower than a preset learning lower limit frequency. In a case where the first learning threshold and the second learning threshold are set as the learning thresholds in the synaptic circuits 14, the control circuit 16 reduces both the first learning threshold and the second learning threshold in a case where the frequency of the firing signal is lower than the learning upper limit frequency.

The learning upper limit frequency indicates an upper limit value of the frequency of the firing signal. The learning lower limit frequency indicates a lower limit value of the frequency of the firing signal. Note that the learning lower limit frequency is equal to the learning upper limit frequency or lower than the learning upper limit frequency.

For example, the control circuit 16 generates a frequency signal representing the frequency of the firing signal by a voltage, by an analog integration circuit using a capacitor, and compares the generated frequency signal with the voltage representing the learning upper limit frequency and the voltage representing the learning lower limit frequency. Then, the control circuit 16 increases the first learning threshold and the second learning threshold in a case where the frequency signal becomes equal to or higher than the voltage representing the learning upper limit frequency, and reduces the first learning threshold and the second learning threshold in a case where the frequency signal becomes lower than the voltage representing the learning lower limit frequency. The control circuit 16 may digitally calculate the frequency of the firing signal by using a digital counter or the like.

Note that the frequency of the firing signal is also detected in each of the neuron circuits 18. Thus, instead of generating and calculating the frequency signal, the control circuit 16 may acquire, from each of the neuron circuits 18, the frequency signal indicating the frequency of the firing signal.

The control circuit 16 may increase or reduce the learning threshold by comparing the frequency of the firing signal with the learning upper limit frequency and the learning lower limit frequency at the timing when the firing signal is output from the post-synaptic neuron circuit 24. Moreover, the control circuit 16 may increase or reduce the learning threshold by comparing the frequency of the firing signal with the learning upper limit frequency and the learning lower limit frequency at every fixed time or every time a given event is generated.

The control circuit 16 may change each of the first learning threshold and a second learning threshold stepwise at every given step. For example, the control circuit 16 may change each of the first learning threshold and the second learning threshold in steps such as in units of 0.1 volts.

In this case, for example, the control circuit 16 adjusts the first learning threshold as in an expression (3).

$$V_{Lup} = \begin{cases} V_{Lup} + \Delta V_L^+ \ \ldots \ H \geqq H_{Lup} \\ V_{Lup} + \Delta V_L^- \ \ldots \ H < H_{ldw} \end{cases} \tag{3}$$

Moreover, for example, the control circuit 16 adjusts the second learning threshold as in an expression (4).

$$V_{Ldw} = \begin{cases} V_{Ldw} + \Delta V_L^+ \ \ldots \ H \geqq H_{Lup} \\ V_{Ldw} + \Delta V_L^- \ \ldots \ H < H_{ldw} \end{cases} \tag{4}$$

$V_{Lup}$ indicates the first learning threshold. $V_{Ldw}$ indicates the second learning threshold. H indicates the frequency of the firing signal. $H_{Lup}$ indicates the learning upper limit frequency. $H_{Ldw}$ indicates the learning lower limit frequency.

$$\Delta V_L^+$$

indicates an increase amount of the first learning threshold and the second learning threshold of a case where the frequency of the firing signal becomes equal to or higher than the learning upper limit frequency.

$$\Delta V_L^-$$

indicates a reduce amount of the first learning threshold and the second learning threshold of a case where the frequency of the firing signal becomes lower than the learning lower limit frequency.

$\Delta V_L^+$ and $\Delta V_L^-$ may be equal.

Note that the first learning threshold and the second learning threshold are each given an adjustable range. In a case where the first learning threshold is an upper limit value of the adjustable range, the control circuit 16 does not increase the first learning threshold and the second learning threshold even when the frequency of the firing signal becomes equal to or higher than the learning upper limit frequency. In addition, in a case where the second learning threshold is a lower limit value of the adjustable range, the control circuit 16 does not reduce the first learning threshold and the second learning threshold even when the frequency of the firing signal becomes lower than the learning lower limit frequency.

In a case where the frequency of the firing signal becomes equal to or higher than the firing upper limit frequency, each of the neuron circuits 18 increases the firing threshold in order to reduce the frequency of the firing signal. Thus, in a case where the frequency of the firing signal becomes equal to or higher than the learning upper limit frequency, as the firing threshold of the neuron circuit 18 increases, the control circuit 16 also increases the learning threshold of each of one or more synaptic circuits 14 that supply the output signals to the neuron circuit 18.

In addition, in a case where the frequency of the firing signal becomes lower than the firing lower limit frequency, the neuron circuit 18 reduces the firing threshold in order to increase the frequency of the firing signal. Thus, in a case where the frequency of the firing signal becomes lower than the learning lower limit frequency, the control circuit 16 also reduces the learning threshold of each of the one or more synaptic circuits 14 that supply the output signal to the neuron circuit 18 as the firing threshold of the neuron circuit 18 reduces.

As a result, the control circuit 16 is able to eliminate a phenomenon in which the firing threshold becomes smaller than the learning threshold, the synaptic weight continuing to reduce, and appropriate learning becoming impossible in the phenomenon. Therefore, it is possible to accurately learn the synaptic weight.

Note that the control circuit 16 may reset the learning threshold (such as each of the first learning threshold and the second learning threshold) to a preset value, for example, at a predetermined timing or stochastically. As a result, the control circuit 16 can reset the learning threshold (such as each of the first learning threshold and the second learning threshold) and cause the learning to be performed again regardless of the firing threshold set in the post-synaptic neuron circuit 24.

In addition, the control circuit 16 can be realized by a configuration similar to that of the firing threshold adjustment circuit 36. Thus, a part or all of circuits included in the control circuit 16 and the firing threshold adjustment circuit 36 may be common circuits.

Figure 4:
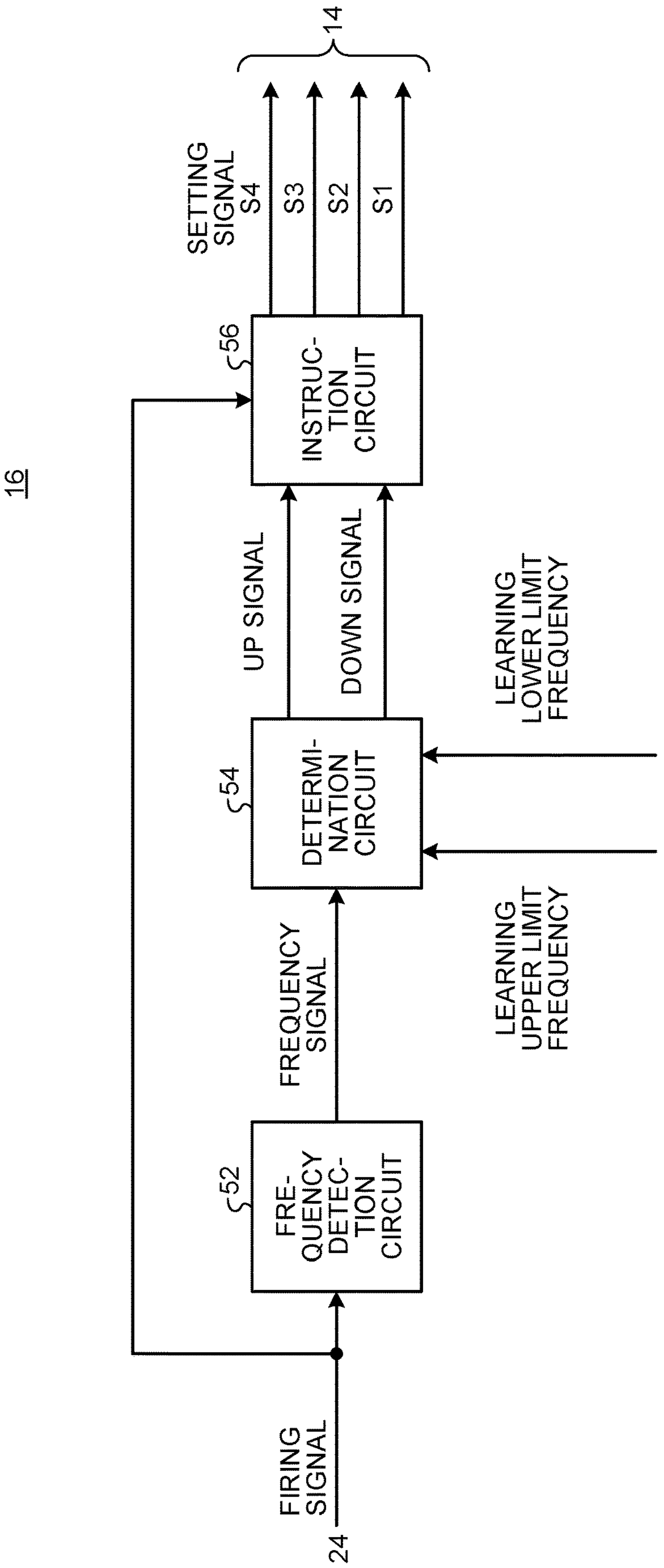
FIG. 4 is a configuration diagram of the control circuit.

FIG. 4 is a diagram illustrating a configuration of the control circuit 16. The control circuit 16 includes a frequency detection circuit 52, a determination circuit 54, and an instruction circuit 56 in association with the target neuron circuit in the plurality of neuron circuits 18.

The frequency detection circuit 52 acquires the firing signal output from the target neuron circuit. By performing analog integration of the firing signal by using a capacitor, the frequency detection circuit 52 generates a frequency signal indicating the frequency of the firing signal by a voltage. The frequency detection circuit 52 may digitally generate the frequency signal by using a digital counter or the like.

In the determination circuit 54, a voltage representing the learning upper limit frequency and a voltage representing the learning lower limit frequency are set in advance. In addition, the determination circuit 54 acquires the frequency signal. The determination circuit 54 outputs an UP signal in a case where the voltage of the frequency signal is equal to or higher than the voltage representing the learning upper limit frequency. In a case where the voltage of the frequency signal is lower than the voltage representing the learning lower limit frequency, the determination circuit 54 outputs a DOWN signal.

The instruction circuit 56 acquires the UP signal and the DOWN signal from the determination circuit 54. Then, the instruction circuit 56 outputs a setting signal for setting the first learning threshold and the second learning threshold on the basis of the UP signal and the DOWN signal. For example, in a case where the first learning threshold and the second learning threshold are changed stepwise at every given step, the instruction circuit 56 outputs a setting signal indicating which stage the first learning threshold and the second learning threshold should be set.

For example, in a case where the first learning threshold and the second learning threshold are each changed in four stages, the instruction circuit 56 outputs the setting signal including signals of S1, S2, S3, and S4. In a case of setting the first learning threshold and the second learning threshold to values in a first stage, the instruction circuit 56 sets S1 to High and the others to Low. In a case of setting the first learning threshold and the second learning threshold to values in a second stage, the instruction circuit 56 sets S2 to High and the others to low. In a case of setting the first learning threshold and the second learning threshold to values in a third stage, the instruction circuit 56 sets S3 to High and the others to Low. In a case of setting the first learning threshold and the second learning threshold to values in a fourth stage, the instruction circuit 56 sets S4 to High and the others to Low.

In a case where the UP signal is output at the timing when the firing signal is output from the target neuron circuit, the instruction circuit 56 increases the first learning threshold and the second learning threshold by one stage. Moreover, in a case where the DOWN signal is output at the timing when the firing signal is output from the target neuron circuit, the instruction circuit 56 reduces the first learning threshold and the second learning threshold by one stage. Note that, even in a case where the UP signal is output, the instruction circuit 56 does not change the first learning threshold and the second learning threshold in a case where the first learning threshold and the second learning threshold are set to the upper limit value of the changeable range. Even in a case where the DOWN signal is output, the instruction circuit 56 does not change the first learning threshold and the second learning threshold in a case where the first learning threshold and the second learning threshold are set to the lower limit value of the changeable range.

The instruction circuit 56 supplies such a setting signal to each of the one or more synaptic circuits 14, which supply the output signals to the target neuron circuit, in common.

Note that the control circuit 16 may not include the frequency detection circuit 52 in a case where the firing threshold adjustment circuit 36 included in the target neuron circuit generates the frequency signal. In this case, the control circuit 16 acquires the frequency signal from the firing threshold adjustment circuit 36 included in the target neuron circuit.

Moreover, in a case where the learning upper limit frequency is equal to the firing upper limit frequency set in the firing threshold adjustment circuit 36 of the target neuron circuit, and the learning lower limit frequency is equal to the firing lower limit frequency set in the firing threshold adjustment circuit 36 of the target neuron circuit, the control circuit 16 may not further include the determination circuit 54. In this case, the control circuit 16 acquires the UP signal and the DOWN signal from the firing threshold adjustment circuit 36 of the target neuron circuit.

Moreover, in a case where the number of stages in which the first learning threshold and the second learning threshold are changed is the same as the number of stages in which the firing threshold adjusted by the firing threshold adjustment circuit 36 of the target neuron circuit is changed, the control circuit 16 may not further include the instruction circuit 56. In this case, the control circuit 16 receives the setting signal from the firing threshold adjustment circuit 36 of the target neuron circuit, and supplies the setting signal to each of the one or more synaptic circuits 14, which supply the output signals to the target neuron circuit, in common.

Figure 5:
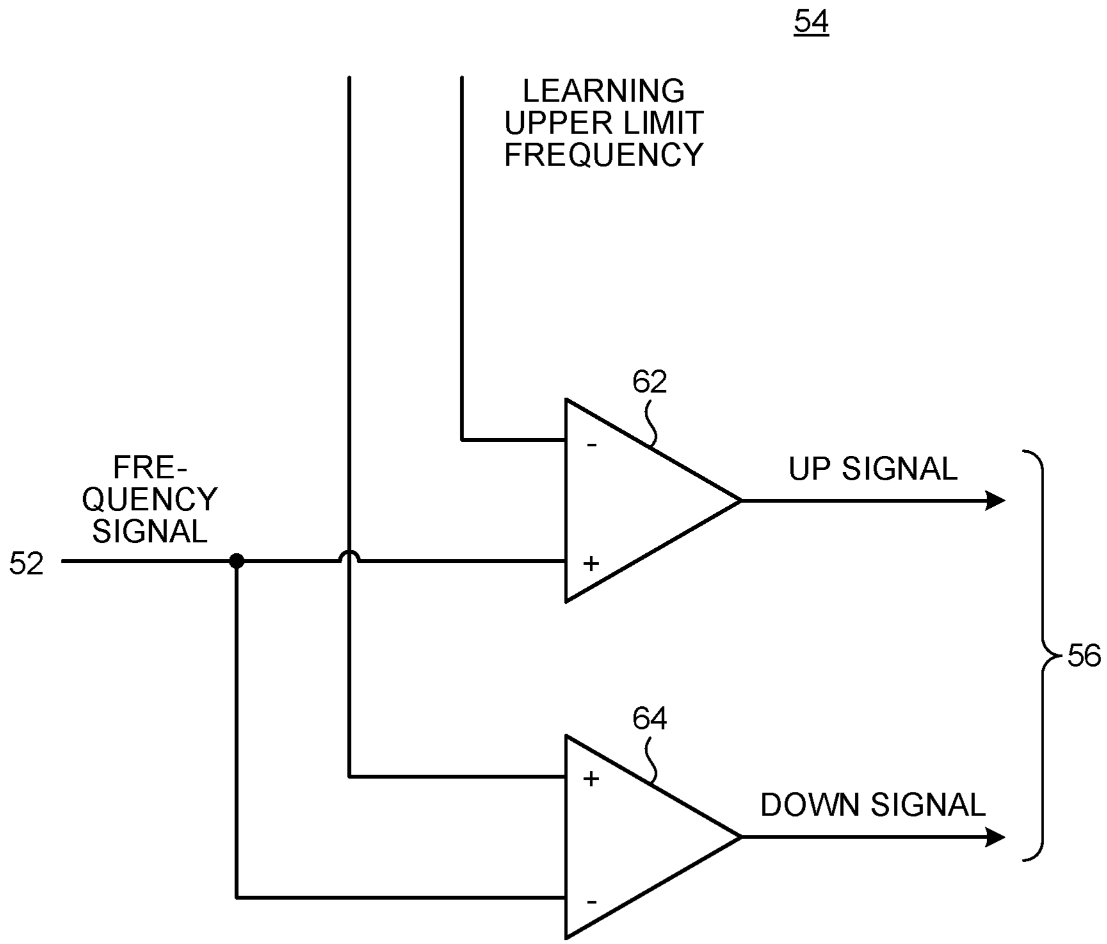
FIG. 5 is a configuration diagram of a determination circuit.

FIG. 5 is a diagram illustrating an example of a configuration of the determination circuit 54. The determination circuit 54 includes a first comparator 62 and a second comparator 64, as an example.

The first comparator 62 acquires the frequency signal from the frequency detection circuit 52. In addition, the first comparator 62 acquires the voltage representing the learning upper limit frequency. The first comparator 62 outputs the UP signal that becomes High in a case where the frequency signal is equal to or higher than the voltage representing the learning upper limit frequency and that becomes Low in a case where the frequency signal is lower than the voltage representing the learning upper limit frequency. The first comparator 62 supplies the UP signal to the instruction circuit 56.

The second comparator 64 acquires the frequency signal from the frequency detection circuit 52. In addition, the second comparator 64 acquires the voltage representing the learning lower limit frequency. The second comparator 64 outputs the DOWN signal that becomes High in a case where the frequency signal is lower than the voltage representing the learning lower limit frequency and that becomes Low in a case where the frequency signal is equal to or higher than the voltage representing the learning lower limit frequency. The second comparator 64 supplies the DOWN signal to the instruction circuit 56.

Figure 6:
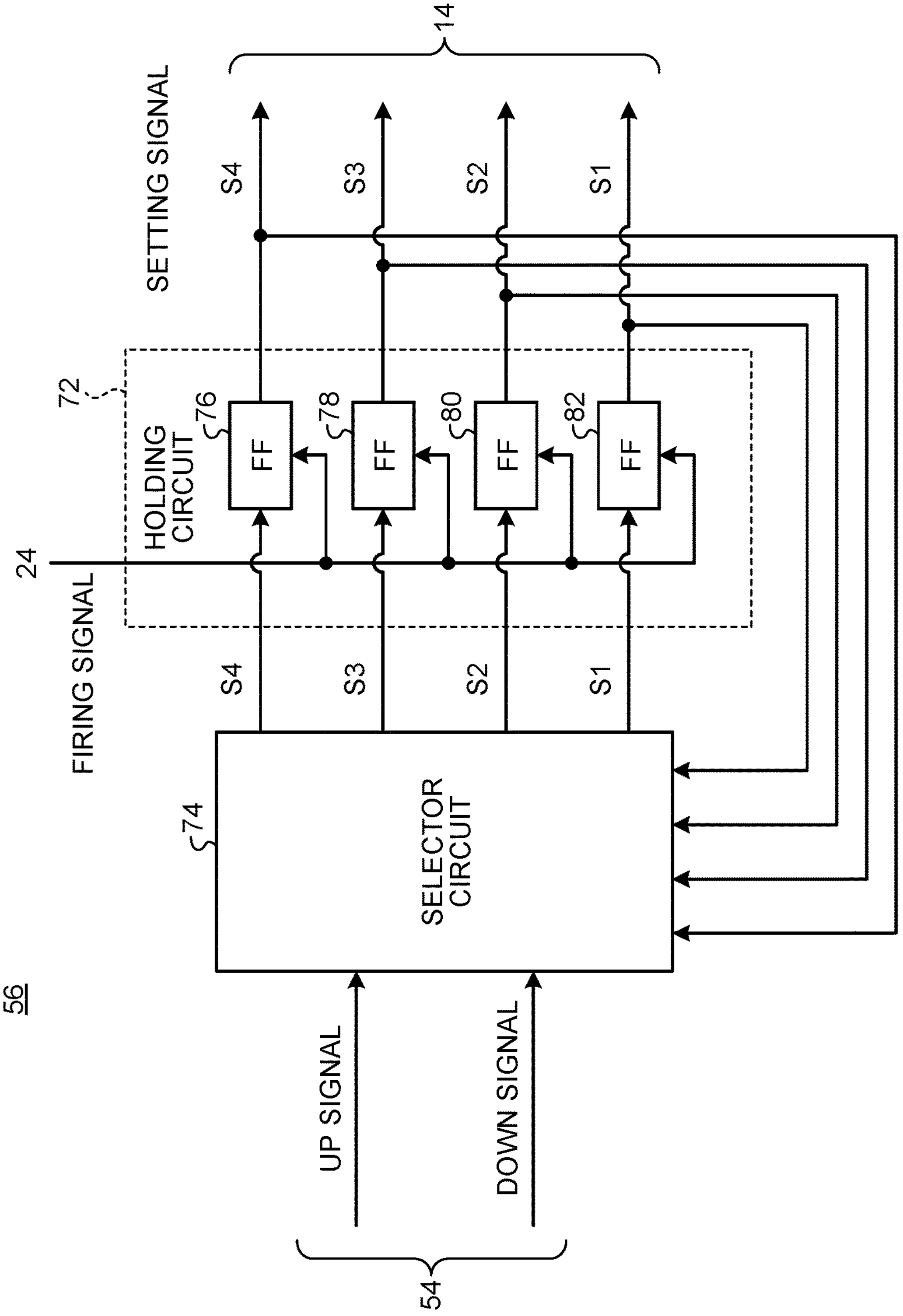
FIG. 6 is a configuration diagram of an instruction circuit.

FIG. 6 is a diagram illustrating an example of a configuration of the instruction circuit 56. The instruction circuit 56 includes, for example, a holding circuit 72 and a selector circuit 74.

The holding circuit 72 holds the setting signal supplied to each of the one or more synaptic circuits 14 at the moment. For example, in a case where the first learning threshold and the second learning threshold are changed in four stages, the holding circuit 72 includes a first flip-flop 76 that holds S1, a second flip-flop 78 that holds S2, a third flip-flop 80 that holds S3, and a fourth flip-flop 82 that holds S4.

The selector circuit 74 acquires the UP signal and the DOWN signal from the determination circuit 54. In addition, the selector circuit 74 feeds back the setting signal supplied to each of the one or more synaptic circuits 14 at the moment, and acquires the setting signal from the holding circuit 72. In a case of acquiring the UP signal, the selector circuit 74 refers to the setting signal supplied to each of the one or more synaptic circuits 14 at the moment, and outputs a setting signal in which the first learning threshold and the second learning threshold are increased by one stage. In addition, in a case of acquiring the DOWN signal, the selector circuit 74 refers to the setting signal supplied to each of the one or more synaptic circuits 14 at the moment, and outputs a setting signal in which the first learning threshold and the second learning threshold are reduced by one stage.

At the timing of receiving the firing signal, the holding circuit 72 takes in and holds the setting signal output from the selector circuit 74. As a result, the holding circuit 72 can update the setting signal at the timing when the firing signal is output.

Figure 7:
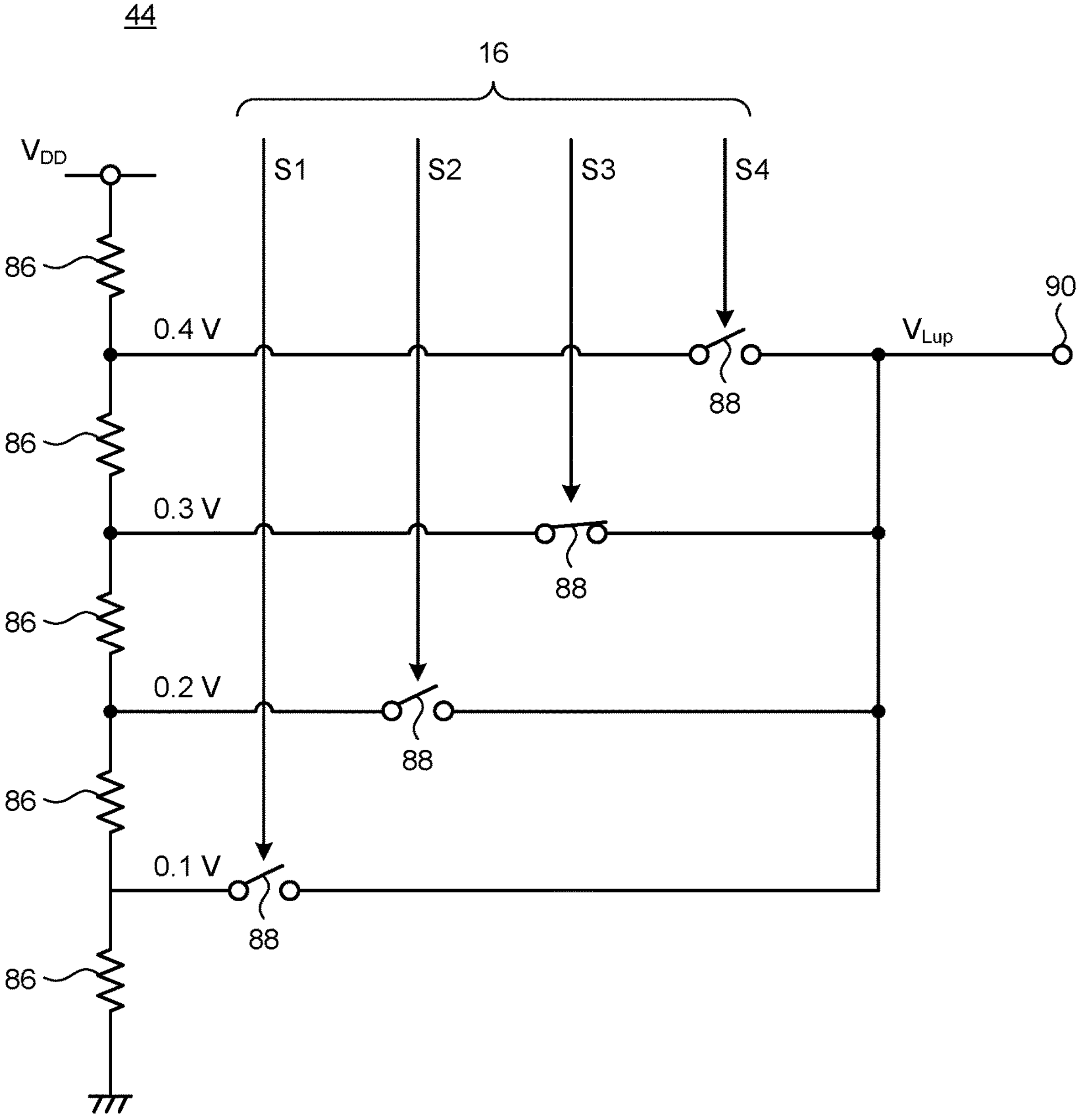
FIG. 7 is a configuration diagram of a circuit that generates a voltage indicating a first learning threshold in a learning circuit.

FIG. 7 is a configuration diagram of a circuit that generates the voltage indicating the first learning threshold in the learning circuit 44 of each of the synaptic circuits 14. The learning circuit 44 acquires the setting signal from the control circuit 16, and internally generates the voltage ($V_{Lup}$) indicating the first learning threshold and the voltage ($V_{Ldwn}$) indicating the second learning threshold on the basis of the acquired setting signal.

The circuit that generates the voltage ($V_{Lup}$) indicating the first learning threshold includes, for example, a plurality of voltage dividing resistors 86, a plurality of switches 88, and a voltage output terminal 90.

The voltage dividing resistors 86 are connected in series and connected between reference potential and power supply potential. Each of connection points in the voltage dividing resistors 86 connected in series generates the voltage ($V_{Lup}$) in a corresponding stage in a case where the first learning threshold is changed by multiple stages at every step.

The switches 88 correspond to the connection points in the voltage dividing resistors 86 connected in series. Each of the switches 88 conducts or disconnects a corresponding connection point and the voltage output terminal 90. Any one of the switches 88 is brought into a conductive state and the others are brought into a disconnected state by the setting signal.

For example, in the example of FIG. 7, the learning circuit 44 acquires the setting signal including the signals of S1, S2, S3, and S4 from the control circuit 16. In a case of receiving the setting signal in which S1 is set to High and S2, S3, and S4 are set to Low, the switches 88 connects a connection point, which generates the lowest voltage, to the voltage output terminal 90, and disconnects the others. In addition, in a case of receiving the setting signal in which S2 is set to High and S1, S3, and S4 are set to Low, the switches 88 connects a connection point, which generates the second lowest voltage, to the voltage output terminal 90, and disconnects the others. In addition, in a case of receiving the setting signal in which S3 is set to High and S1, S2, and S4 are set to Low, the switches 88 connects a connection point, which generates the third lowest voltage, to the voltage output terminal 90, and disconnects the others. In addition, in a case of receiving the setting signal in which S4 is set to High and S1, S2, and S3 are set to Low, the switches 88 connects a connection point, which generates the highest voltage, to the voltage output terminal 90, and disconnects the others.

Note that the learning circuit 44 also includes a circuit configured to generate the voltage ($V_{Ldw}$) indicating the second learning threshold. This circuit has a configuration similar to that of FIG. 7. Note that, in the circuit that generates the voltage ($V_{Ldw}$) indicating the second learning threshold, a voltage at each of connection points in the voltage dividing resistors 86 connected in series is lower than that in the circuit that generates the voltage ($V_{Lup}$) indicating the first learning threshold. Moreover, in a case where the first learning threshold and the second learning threshold are equal, the learning circuit 44 includes only the circuit illustrated in FIG. 7.

Figure 8:
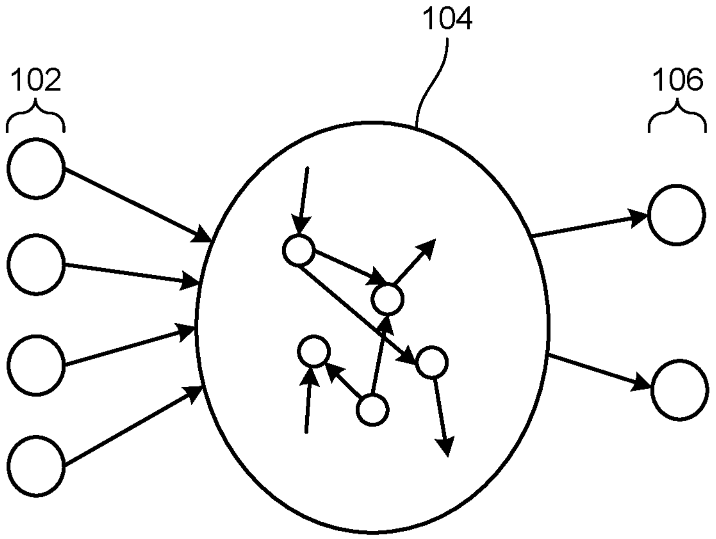
FIG. 8 is a configuration diagram of a reservoir computing apparatus according to the embodiment.

FIG. 8 is a diagram illustrating a configuration of a reservoir computing apparatus according to the embodiment. The reservoir computing apparatus includes an input layer 102, a reservoir layer 104 that is a recurrent neural network, and an output layer 106. The neural network apparatus 10 may be used as the reservoir layer 104 in such reservoir computing.

In this case, at least one of the synaptic circuits 14 included in the neural network apparatus 10 feeds back the output signal, and supplies the output signal to a neuron circuit 18. That is, at least one of the synaptic circuits 14 supplies the output signal to one of the neuron circuits 18, which is arranged in a preceding stage relative to the synaptic circuit 14 that supplies the output signal to the pre-synaptic neuron circuit 22.

Figure 9:
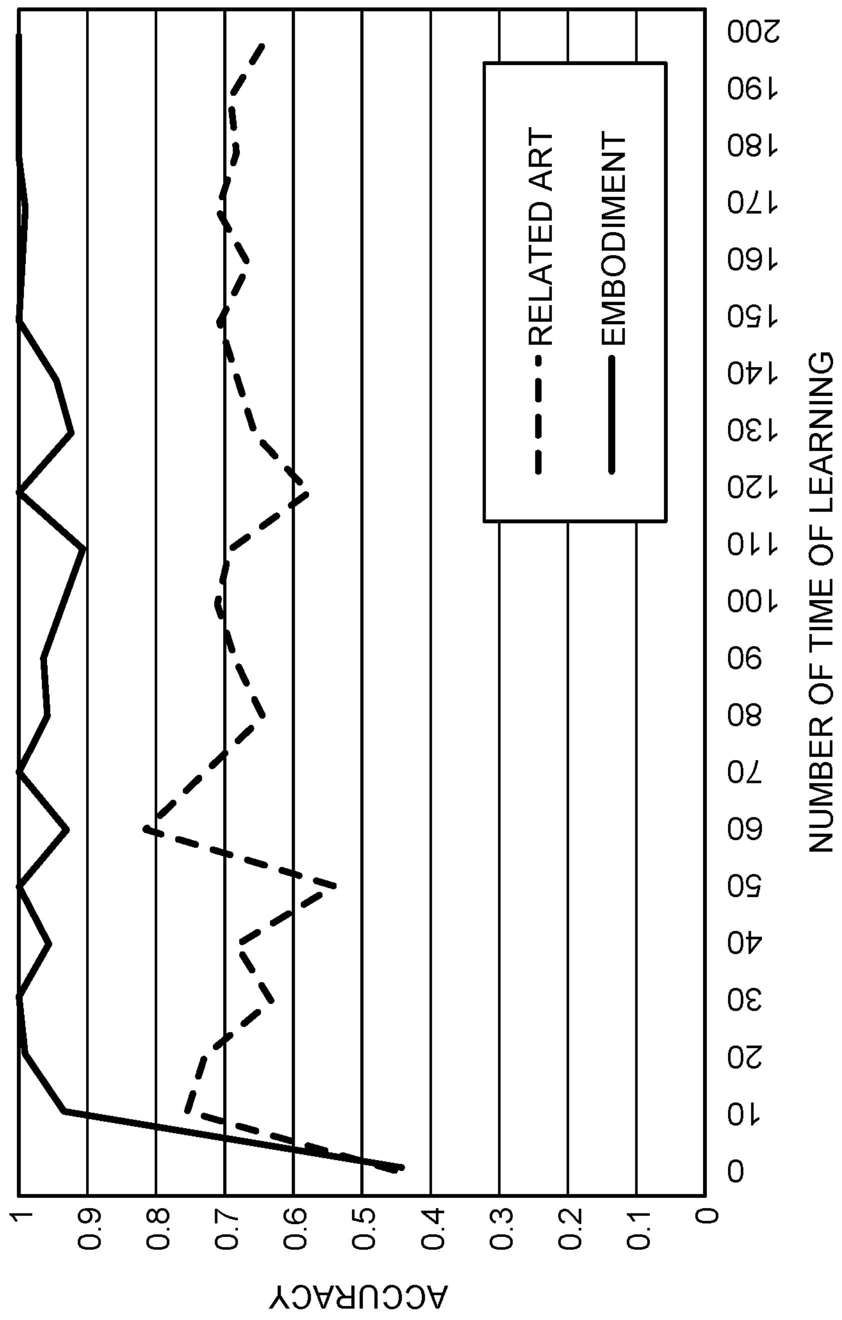
FIG. 9 is a diagram illustrating a simulation result indicating accuracy with respect to the number of times of learning.

FIG. 9 is a diagram illustrating a simulation result indicating accuracy with respect to the number of times of learning of a case where the neural network apparatus 10 is applied to the reservoir computing apparatus. Note that an example in which the firing threshold is switched in seven stages of 0.125 V, 0.15 V, 0.2 V, 0.25 V, 0.3 V, 0.35 V, and 0.4 V is illustrated in FIG. 9. Moreover, an example in which the first learning threshold and the second learning threshold are equal and switching thereof is performed in seven stages of (0.125/2) V, (0.15/2) V, (0.2/2) V, (0.25/2) V, (0.3/2) V, (0.35/2) V, and (0.4/2) V in synchronization with the firing threshold is illustrated in FIG. 9.

Moreover, accuracy of a neural network apparatus in related art in a case where a control circuit 16 is not included and a learning threshold is fixed is also illustrated in FIG. 9 for comparison.

In the example of FIG. 9, in a case where the neural network apparatus 10 is applied to the reservoir computing apparatus, accurate inference can be performed compared to the neural network apparatus in the related art.

As described above, the neural network apparatus 10 according to the present embodiment updates the synaptic weight in accordance with the internal potential V of the post-synaptic neuron circuit 24 at the time of firing of the pre-synaptic neuron circuit 22. Therefore, learning with high accuracy can be performed. Moreover, the neural network apparatus 10 according to the present embodiment adjusts the firing frequency of each of the neuron circuits 18 to a relatively narrow range. Therefore, it is possible to perform accurate inference.

Moreover, in a case where frequency of a firing signal of a neuron circuit 18 becomes equal to or higher than the learning upper limit frequency, the neural network apparatus 10 according to the present embodiment also increases a learning threshold of each of one or more synaptic circuits 14, which supply output signals to the neuron circuit 18, along with an increase in a firing threshold of the neuron circuit 18. Moreover, in a case where frequency of a firing signal of a neuron circuit 18 becomes lower than the learning lower limit frequency, the neural network apparatus 10 according to the present embodiment also reduces a learning threshold of each of one or more synaptic circuits 14, which supply output signals to the neuron circuit 18, along with a reduce in a firing threshold of the neuron circuit 18. As a result, the neural network apparatus 10 according to the present embodiment can eliminate a phenomenon, the firing threshold becoming smaller than the learning threshold, the synaptic weight continuing to reduce, and appropriate learning becoming impossible in the phenomenon, and accurately learn the synaptic weight.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A neural network apparatus comprising:

a plurality of neuron circuits;

a plurality of synaptic circuits; and a control circuit, wherein each neuron circuit in the plurality of neuron circuits includes a potential holding circuit configured to receive an output signal output from a synaptic circuit in the plurality of synaptic circuits and hold internal potential changing in accordance with a level or a time width of the received output signal, a firing circuit configured to output a firing signal in a case where an absolute value of the internal potential is larger than a firing threshold, and a firing threshold adjustment circuit configured to increase the firing threshold when the frequency of the firing signal is equal to or higher than a firing upper limit frequency given in advance, and reduce the firing threshold when the frequency of the firing signal is lower than a firing lower limit frequency given in advance, the firing lower limit frequency being equal to or smaller than the firing upper limit frequency, each synaptic circuit in the plurality of synaptic circuits includes a weight storage circuit configured to store a synaptic weight, a transmission circuit configured to receive the firing signal output from a pre-synaptic neuron circuit being a neuron circuit in the plurality of neuron circuits and output the output signal to a post-synaptic neuron circuit being a neuron circuit in the plurality of neuron circuits, the output signal being obtained by adding influence of the synaptic weight to the received firing signal, and a learning circuit configured to, in a case where the firing signal is output from the pre-synaptic neuron circuit, increase the synaptic weight when the absolute value of the internal potential held in the post-synaptic neuron circuit is equal to or larger than a first learning threshold being the learning threshold, and reduce the synaptic weight when the absolute value of the internal potential is smaller than a second learning threshold being the learning threshold, the second learning threshold being equal to or smaller than the first learning threshold, and the control circuit is configured to change the learning threshold in accordance with frequency of the firing signal output from a target neuron circuit being at least one neuron circuit in the plurality of neuron circuits, the learning threshold being used for changing the synaptic weight stored in one or more synaptic circuits each outputting the output signal to the target neuron in the plurality of neuron circuits.

2. The neural network apparatus according to claim 1, wherein the control circuit is configured to increase the first learning threshold and the second learning threshold in the one or more synaptic circuits when the frequency of the firing signal output from a target neuron circuit is equal to or higher than a learning upper limit frequency given in advance, and reduce the first learning threshold and the second learning threshold in the one or more synaptic circuits when the frequency of the firing signal output from a target neuron circuit is lower than a learning lower limit frequency given in advance, and the learning lower limit frequency is equal to or smaller than the learning upper limit frequency.

3. The neural network apparatus according to claim 2, wherein the control circuit is configured to generate a frequency signal representing the frequency of the firing signal by a voltage, the frequency signal being generated by performing analog integration of the firing signal using a capacitor, increase the first learning threshold and the second learning threshold when the voltage of the frequency signal is equal to or higher than a voltage representing the learning upper limit frequency, and reduce the first learning threshold and the second learning threshold when the voltage of the frequency signal is lower than a voltage representing the learning lower limit frequency.

4. The neural network apparatus according to claim 1, wherein the control circuit is configured to change each of the first learning threshold and the second learning threshold stepwise at every given step.

5. The neural network apparatus according to claim 1, wherein the control circuit is configured to reset each of the first learning threshold and the second learning threshold to a preset value at predetermined timing or stochastically.

6. The neural network apparatus according to claim 1, wherein at least one synaptic circuit in the plurality of synaptic circuits is configured to supply the output signal to the pre-synaptic neuron circuit in the plurality of neuron circuits, or to a neuron circuit in the plurality of neuron circuits, which is arranged in a preceding stage relative to a synaptic circuit supplying the output signal to the pre-synaptic neuron circuit.

7. A control method, comprising:

controlling a parameter of a neural network apparatus, the neural network apparatus including a plurality of neuron circuits, a plurality of synaptic circuits, and a control circuit, wherein each neuron circuit in the plurality of neuron circuits includes:

a potential holding circuit configured to receive an output signal output from a synaptic circuit in the plurality of synaptic circuits and hold internal potential changing in accordance with a level or a time width of the received output signal;

a firing circuit configured to output a firing signal in a case where an absolute value of the internal potential is larger than a firing threshold; and a firing threshold adjustment circuit configured to increase the firing threshold when the frequency of the firing signal is equal to or higher than a firing upper limit frequency given in advance, and reduce the firing threshold when the frequency of the firing signal is lower than a firing lower limit frequency given in advance, the firing lower limit frequency being equal to or smaller than the firing upper limit frequency, each synaptic circuit in the plurality of synaptic circuits includes:

a weight storage circuit configured to store a synaptic weight;

a transmission circuit configured to receive the firing signal output from a pre-synaptic neuron circuit being a neuron circuit in the plurality of neuron circuits and output the output signal to a post-synaptic neuron circuit being a neuron circuit in the plurality of neuron circuits, the output signal being obtained by adding influence of the synaptic weight to the received firing signal; and a learning circuit configured to, in a case where the firing signal is output from the pre-synaptic neuron circuit, increase the synaptic weight when the absolute value of the internal potential held in the post-synaptic neuron circuit is equal to or larger than a first learning threshold being the learning threshold, and reduce the synaptic weight when the absolute value of the internal potential is smaller than a second learning threshold being the learning threshold, the second learning threshold being equal to or smaller than the first learning threshold, and the control method further comprises:

changing the learning threshold in accordance with frequency of the firing signal output from a target neuron circuit being at least one neuron circuit in the plurality of neuron circuits, the learning threshold being used for changing the synaptic weight stored in one or more synaptic circuits each outputting the output signal to the target neuron in the plurality of neuron circuits.

8. The control method according to claim 7, wherein the changing of the learning threshold includes increasing the first learning threshold and the second learning threshold in the one or more synaptic circuits when the frequency of the firing signal output from a target neuron circuit is equal to or higher than a learning upper limit frequency given in advance, and reducing the first learning threshold and the second learning threshold in the one or more synaptic circuits when the frequency of the firing signal output from a target neuron circuit is lower than a learning lower limit frequency given in advance, and the learning lower limit frequency is equal to or smaller than the learning upper limit frequency.

9. The control method according to claim 8, wherein the changing of the learning threshold includes generating a frequency signal representing the frequency of the firing signal by a voltage, the frequency signal being generated by performing analog integration of the firing signal using a capacitor, increasing the first learning threshold and the second learning threshold when the voltage of the frequency signal is equal to or higher than a voltage representing the learning upper limit frequency, and reducing the first learning threshold and the second learning threshold when the voltage of the frequency signal is lower than a voltage representing the learning lower limit frequency.

10. The control method according to claim 9, wherein the changing of the learning threshold includes changing each of the first learning threshold and the second learning threshold stepwise at every given step.

11. The control method according to claim 7, wherein the changing of the learning threshold includes resetting each of the first learning threshold and the second learning threshold to a preset value at predetermined timing or stochastically.

12. The control method according to claim 7, wherein at least one synaptic circuit in the plurality of synaptic circuits is configured to supply the output signal to the pre-synaptic neuron circuit in the plurality of neuron circuits, or to a neuron circuit in the plurality of neuron circuits, which is arranged in a preceding stage relative to a synaptic circuit supplying the output signal to the pre-synaptic neuron circuit.

* * * * *